United States Patent [19]

Helt

[11] Patent Number: 4,687,948

[45] Date of Patent: Aug. 18, 1987

[54] DUAL MODE CONTROLLER FOR ASSIGNING OPERATING PRIORITY OF TWO LOADS

[75] Inventor: Robert W. Helt, Tyler, Tex.

[73] Assignee: American Standard Inc., New York, N.Y.

[21] Appl. No.: 842,585

[22] Filed: Mar. 21, 1986

[51] Int. Cl.[4] .............................................. H02J 1/00
[52] U.S. Cl. ...................................... 307/38; 361/191
[58] Field of Search ........................ 307/31, 38, 39, 41, 307/85–86, 125–126, 140; 361/160, 191

[56] References Cited

U.S. PATENT DOCUMENTS

| | | | |
|---|---|---|---|
| 2,712,101 | 6/1955 | Salati | 307/38 |
| 2,981,869 | 4/1961 | Balint | 307/38 |
| 3,515,892 | 6/1970 | Wittbroot | 307/38 |
| 3,629,599 | 12/1971 | Zuckerman | 307/38 |
| 3,937,977 | 2/1976 | Carr | 307/38 |
| 4,064,485 | 12/1977 | Leyde | 340/147 R |
| 4,066,913 | 1/1978 | Manning et al. | 307/38 |
| 4,310,770 | 1/1982 | Keener et al. | 307/35 |
| 4,318,006 | 3/1982 | Himeno et al. | 307/38 |
| 4,357,665 | 11/1982 | Korff | 364/492 |
| 4,419,589 | 12/1983 | Ross | 307/39 |
| 4,437,018 | 3/1984 | Manley | 307/38 |

Primary Examiner—Vit W. Miska
Attorney, Agent, or Firm—Ronald M. Anderson; William J. Beres; Robert J. Harter

[57] ABSTRACT

A dual mode controller used to allow only one of either a primary heating/cooling system or a hot water heater to operate at one time. It is particularly useful where utility billing is based on peak demand. A two-position switch is used to select the mode such that in one switch position the heating/cooling system is given priority regardless of the operating status of the hot water heater, and in the other position the operating load is given priority. This relatively simple circuit includes one conventional relay and either another conventional relay or a pilot duty relay energized by an integral "doughnut" type current transformer.

19 Claims, 3 Drawing Figures

DUAL MODE CONTROLLER FOR ASSIGNING OPERATING PRIORITY OF TWO LOADS

DESCRIPTION

1. Technical Field

This invention generally pertains to a dual mode controller for selectively controlling which of two loads is given priority over the other to operate, wherein only one can operate at a time, and specifically to a dual mode controller for use with a heating/cooling system and a water heater load.

2. Background of the Invention

Controllers for turning off selected loads during peak demand of electrical power are readily available and are particularly useful where utility billing is based on peak demand. Such controllers are generally designed for industrial and commercial needs and as a result, tend to be rather complicated and expensive. U.S. Pat. Nos. 4,064,485; 4,310,770; and 4,357,665 illustrate three examples of controllers based on elaborate designs that typically include a microprocessor or other complicated circuitry. Although these controllers provide the required flexibility and control for their intended purpose, their cost can be prohibitive in simple two-load or residential applications.

Therefore, to satisfy such needs, it is an object of this invention to provide a two-load controller having the flexibility of two modes, wherein in the first mode, whenever one load is operating the other is disabled giving priority to whichever load is operating; and wherein in the second mode, one load is given priority over the other to operate regardless of the operating status of the other load.

A further object is to provide a relatively simple and inexpensive dual mode controller.

A still further object is to provide a dual mode controller, wherein the mode is switch selectable.

These and other objects will be apparent from the attached drawings and the description of the preferred embodiments that follow below.

SUMMARY OF THE INVENTION

This invention is a dual mode controller used to allow only one of two electrical loads to operate at a time. The mode determines which load is given priority over the other to operate. In the first mode, whenever a load is energized, the other is disabled, giving priority to whichever load is energized. In the second mode, priority is given to the first load. This invention includes a switch for selecting the mode, sensing means for determining which load is energized, and contact means responsive thereto for preventing the low priority load from operating when the other is energized.

The dual mode feature of this controller provides flexibility only previously found in much more complicated controllers often requiring many discrete components or a microprocessor. Since this invention has very few parts, it is relatively compact and inexpensive compared to controllers presently used.

DESCRIPTION OF THE PREFERRED EMBODIMENT

Figure 1:
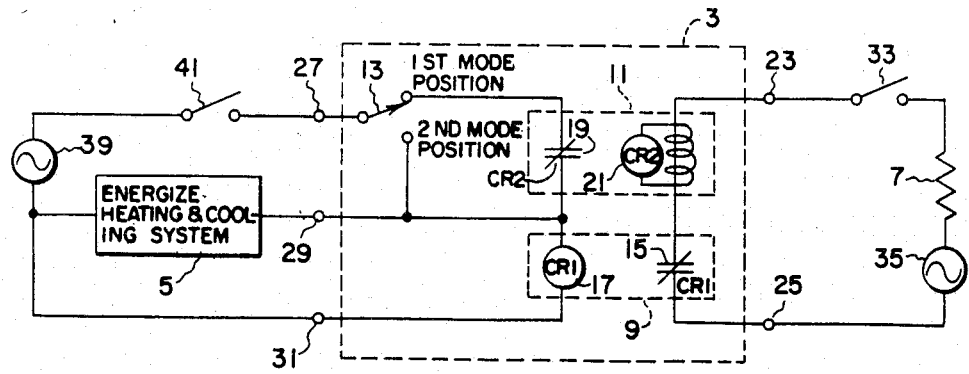
FIG. 1 is a schematic diagram of a first embodiment of the dual mode controller using an inductive type relay.

The subject invention, as shown in FIG. 1, is dual mode controller 3 which is adapted to control the operation of heating/cooling system 5 and hot water heater 7. The three major components of controller 3 include control relay 9, control relay 11, and single pole, double throw switch 13. Relay 9 is a conventional relay that includes normally closed contacts 15 that open when current passes through coil 17. Control relay 11 includes normally closed contacts 19 which are responsive to current flowing through the center aperture of a "doughnut" type current transformer 21. It should be appreciated that coil 17 and transformer 21 function as current sensors and are two examples of many sensing means available for determining when an associated load is energized in order to control contacts 15, contacts 19, or other contact means for opening and closing an electrical circuit.

Current transformer 21 is inductively coupled to the conductor carrying current through contacts 15 which are connected to terminals 23 and 25. When switch 13 is in the first position, coil 17, terminal 29, contacts 19, and switch 13 are connected in series between terminals 27 and 31, with terminal 29 connected between contacts 19 and coil 17. When switch 13 is in the second position, contacts 19 are bypassed. Controller 3 includes terminals 23, 25, 27, 29, and 31 for connection to the two loads 5 and 7.

Figure 2:
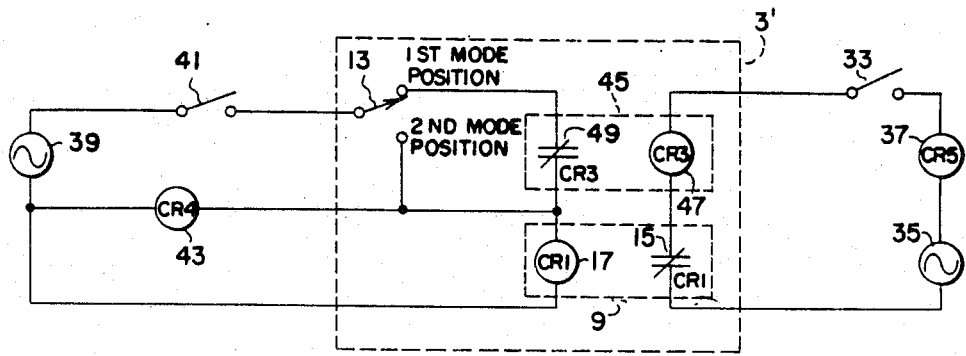
FIG. 2 is a schematic diagram of a second embodiment of the dual mode controller using a conventional relay in place of the inductive type relay.

Still referring to FIG. 1, hot water heater 7, switch 33, and contacts 15 are connected in series to power supply 35. It should be noted that switch 33, which enables hot water heater 7, could also be a thermostat, relay, or other similar device. In addition, as shown in FIG. 2, hot water heater 7 could be replaced by relay 37, which in turn, could enable several hot water heaters or other electrical loads (not shown).

Referring back to FIG. 1, heating/cooling system 5 is connected to terminals 29 and 31. Line power from supply 39 is connected to terminal 31 and, through switch 41, to terminal 27. Switch 41 enables heating/cooling system 5, and like switch 33, could also be a thermostat, relay, or other similar device.

In the first mode, power supply 39 delivers current in series through closed switch 41, switch 13 and normally closed contacts 19, and then at terminal 29 supplies current in parallel through coil 17 and heating/cooling system 5. Current passing through coil 17 disables water heater 7 by opening contacts 15 which are in series therewith. System 5 remains energized and water heater 7 remains disabled until switch 41 opens. When switches 33 and 41 are both open, normally closed contacts 15 and 19 are closed, thus either load can be energized by their corresponding switch, e.g., system 5 by switch 41 and heater 7 by switch 33.

Still in the first mode, when switch 33 closes, current from supply 35 passes in series through water heater 7, switch 33, the aperture of transformer 21, and closed contacts 15. With current passing through transformer 21, contacts 19 are held open, thereby disabling system 5 and preventing coil 17 from opening contacts 15. Thus heater 7 is able to remain energized and system 5 is disabled until switch 33 opens.

In the second mode, contacts 19 are bypassed and the current, passing through coil 17 and system 5, can only be interrupted by switch 41. As a result, system 5 and relay 9 energize whenever switch 41 closes, regardless of the operating status of water heater 7. Current delivered from supply 35 through water heater 7, however, can be interrupted in the second mode not only by switch 33, but also by normally closed contacts 15 which open in response to relay 9 being energized. Since relay 9 is energized whenever system 5 is energized, heater 7 can only operate when system 5 is turned off.

In the second embodiment, shown in FIG. 2, controller 3' includes relay 45 as a replacement for relay 11, used in the first embodiment. Relay 45 includes contacts 49 and coil 47 which respectively replace contacts 19 and transformer 21, also used in the first embodiment. In addition, heating/cooling system 5 and hot water heater 7 have been replaced by relays 43 and 37, respectively. Relays 43 and 37 can each energize one or more loads.

In this second embodiment, current that passes through contacts 15 also passes through coil 47 directly rather than being inductively coupled to transformer 21, as disclosed in the first embodiment. Controller 3' provides the same control functions as controller 3 in the first embodiment.

Figure 3:
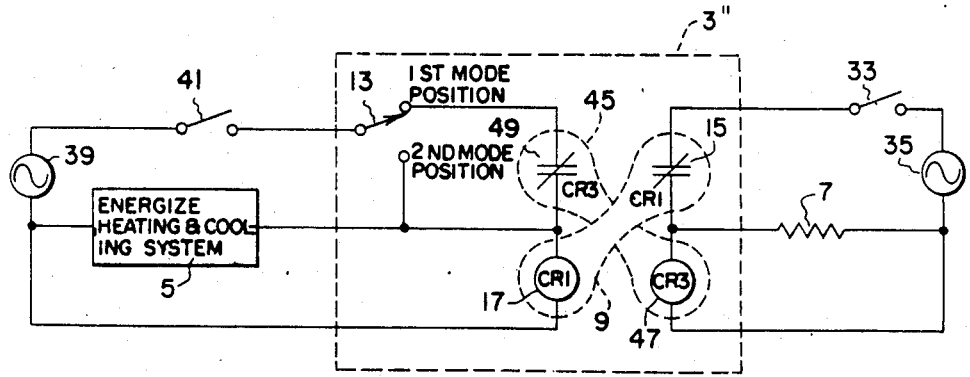
FIG. 3 is a schematic diagram of a third embodiment of the controller.

In the third embodiment, shown in FIG. 3, controller 3" includes conventional relay 45 as a replacement for inductive relay 11. Hot water heater 7 is connected to power supply 35 in series with contacts 15 and switch 33, and in parallel with coil 47. The left side of the circuit has only been changed by replacing contacts 19 with contacts 49. Controller 3" also provides the same dual function mode control as controller 3.

Although this invention is described with respect to three preferred embodiments, modifications thereto will become apparent to those skilled in the art. Therefore, the scope of the invention is to be determined by reference to the claims which follow.

I claim:

1. A dual mode controller used to allow only one of a first and a second load to operate at a time and used to select which load is given priority over the other to operate, comprising:
   a. a switch having a first and a second position;
   b. sensing means for determining which of said first and second loads is operating; and
   c. contact means, responsive to said sensing means and said switch, for allowing only one load to operate at one time with said first load given priority when said switch is in said second position, and when said switch is in said first position, preventing one load from turning on when the other load is operating.

2. The controller as recited in claim 1, wherein said sensing means include a first and a second sensor and said contact means include first and second contacts.

3. The controller as recited in claim 2, wherein said first sensor and said first contacts comprise a first relay and said second sensor and said second contacts comprise a second relay.

4. The controller as recited in claim 2, wherein said first contacts are connected in series with said second sensor.

5. The controller as recited in claim 2, wherein said second contacts are connected in series with said first sensor when said switch is in said first position, and said second contactors are bypassed when said switch is in said second position.

6. The controller as recited in claim 2, wherein said second sensor inductively senses current passing through said first contacts.

7. The controller as recited in claim 2, wherein said first contacts are normally closed when said first load is not operating and said second contacts are normally closed when said second load is not operating.

8. The controller as recited in claim 1 wherein said switch is a single pole double throw switch.

9. A dual mode controller used to allow only one of a first and a second load to operate at a time and used to select which load is given priority over the other to operate, comprising:
   a. a switch having a first and a second position;
   b. first sensing means for determining if said first load is turned on;
   c. second sensing means for determining if said second load is turned on;
   d. first contact means, responsive to said first sensing means for preventing said second load from operating when said first load is energized regardless of the switch position; and
   e. second contact means, responsive to said second sensing means, for preventing said first load from turning on when said second load is operating and said switch is in said second position.

10. The controller as recited in claim 9, wherein said first sensing means and said first contact means comprise a first relay and said second sensing means and said second contact means comprise a second relay.

11. The controller as recited in claim 9, wherein said second sensing means are inductively coupled to current passing through said first contact means.

12. The controller as recited in claim 9, wherein said second contact means are connected in series with said first sensing means when said switch is in said first position and said second contact means are bypasssed when said switch is in said second position.

13. The controller as recited in claim 9, wherein said first contact means are normally closed when said first load is not operating and said second contact means are normally closed when said second load is not operating.

14. The controller as recited in claim 9, wherein said switch is a single pole double throw switch.

15. A dual mode controller used to allow only one of a first and a second load to operate at a time and used to select which load is given priority over the other to operate, comprising:
   a. a switch having a first and a second position;
   b. a first current sensor that determines if said first load is operating;
   c. a second current sensor that determines if said second load is operating;
   d. first contacts for controlling said second load in response to said first current sensor;
   e. second contacts for controlling said first load in response to a second current sensor wherein said second current sensor is in series with said first contacts and wherein said second contacts are connected in series with said first current sensor when said switch is in said second position and said second contacts are bypassed when said switch is in said first position, whereby only one load can operate at one time with said first load having priority when said switch is in said first position and when said switch is in said second position, preventing one load from turning on when the other load is operating.

16. The controller as recited in claim 15, wherein said first contacts and said first current sensor comprise a first relay and said second contacts and said second current sensor comprise a second relay.

17. The controller as recited in claim 15, wherein said first contacts are normally closed when said first load is not operating and said second contacts are normally closed when said second load is not operating.

18. The controller as recited in claim 15, wherein said switch is a single pole double throw switch.

19. The controller as recited in claim 15, wherein said second current sensor is inductively sensitive to current passing through said first contacts.

* * * * *